United States Patent [19]

Ting et al.

[11] Patent Number: 4,480,058

[45] Date of Patent: Oct. 30, 1984

[54] AQUEOUS EPOXY ESTER EMULSIONS

[75] Inventors: Vincent W. Ting, Boulder, Colo.; Richard M. Marcinko, North Royalton, Ohio

[73] Assignee: SCM Corporation, New York, N.Y.

[21] Appl. No.: 222,933

[22] Filed: Jan. 6, 1981

Related U.S. Application Data

[63] Continuation of Ser. No. 212,849, Dec. 4, 1980.

[51] Int. Cl.$^3$ ............................................. C08L 63/00
[52] U.S. Cl. ................................... 523/404; 523/412; 525/113; 525/119; 525/530
[58] Field of Search ...................... 525/119, 113, 530; 260/29.2 EP, 29.4 UA, 29.3, 29.6 NR; 523/404, 412

[56] References Cited

U.S. PATENT DOCUMENTS

| | | | |
|---|---|---|---|
| 3,943,187 | 3/1976 | Wu | 260/29.6 NR |
| 3,945,963 | 3/1976 | Levine et al. | 260/29.6 NR |
| 3,969,300 | 7/1976 | Nagata et al. | 260/29.4 UA |
| 4,021,396 | 5/1977 | Wu | 260/29.6 NR |
| 4,021,504 | 5/1977 | Conrad et al. | 525/119 |
| 4,029,620 | 6/1977 | Chen | 260/29.2 EP |
| 4,122,067 | 10/1978 | Anderson | 260/29.2 EP |
| 4,128,515 | 12/1978 | Tobias et al. | 260/29.2 EP |
| 4,247,439 | 1/1981 | Matthews et al. | 260/29.6 NR |

OTHER PUBLICATIONS

Myers et al., Film–Forming Compositions, vol. 1, part II, pp. 412–415.
Craner et al., Applied Polymer Science, pp. 63–73.
Solomon's, The Chemistry of Organic Film Formers, pp. 25–28, 35.
Noller, Chemistry of Organic Compounds, pp. 21–25.
Kirk Othmer's, Ency. of Chemical Tech., vol. 18, pp. 745–751.
McGraw-Hill's Ency. of Science and Tech., vol. 10, pp. 554–557.

*Primary Examiner*—John Kight
*Assistant Examiner*—Amelia B. Yarbrough
*Attorney, Agent, or Firm*—Thomas M. Schmitz

[57] ABSTRACT

Sanitary coatings based on self-emulsifiable epoxy ester copolymers are produced by esterifying a solvent-soluble carboxyl polymer with an epoxy resin in an organic resin and in the presence of at least about 2% amine catalyst to provide a carboxyl-functional epoxy polymer which can be reacted with a base and dispersed into water.

43 Claims, No Drawings

AQUEOUS EPOXY ESTER EMULSIONS

BACKGROUND OF THE INVENTION

This is a continuation in part of copending application Ser. No. 212,849, filed on Dec. 4, 1980, and the disclosure thereof is incorporated herein by reference.

This invention relates to a process for the preparation of self-emulsifiable epoxy ester copolymer mixtures useful in the production of aqueous emulsion coating compositions and particularly to sanitary coating compositions. This invention further relates to aqueous emulsion coating compositions possessing improved stability.

The present invention provides a process for preparing a self-emulsifiable epoxy ester copolymer mixture which comprises esterifying a solvent-soluble carboxyl-functional polymer with an epoxy resin which is a mixture comprising aromatic polyethers containing oxirane functionality, at least 5% of the aromatic polyethers being constituted by diepoxide, the mixture of aromatic polyethers constituting at least 40% of the total resin solids content and providing oxirane functionality in a stoichiometric deficiency with respect to carboxyl functionality in the carboxylfunctional polymer of from 1:2 to 1:20, the esterification being carried out in organic solvent medium in the presence of greater than 2% of an amine esterification catalyst, based on the weight of the reactants subjected to esterification, and at an elevated temperature sufficient to cause the oxirane functionality to react with the carboxyl functionality until the oxirane functionality is substantially entirely consumed and reacting at least a portion of the carboxyl functionality in the resultant polymer-epoxy resin hydroxy ester reaction product with a base to render this reaction product self-emulsifiable in water.

Epoxy resins contain a plurality of aromatic groups joined together by ether linkages, and hence provide excellent physical and chemical properties. It has been difficult to employ such resins in aqueous medium because they lack storage stability which is of particular importance when spray application is contemplated, especially for the interior of sanitary cans. In order to employ aqueous coatings of higher resin solids content at the desired viscosity, it has been necessary to employ an emulsion system in which a water immiscible component is suspended in an aqueous continum by means of an emulsifying agent. In the self-emulsifiable mixtures produced according to the process of the present invention, the particle size of the emulsion is substantially the same regardless of whether high speed agitation is used or whether the mixture with water is barely stirred.

In the preferred self-emulsifiable mixtures produced according to the present invention, a nongelled hydroxy ester copolymer composition substantially free of oxirane functionality comprises an acidic copolymer epoxy resin hydroxy ester in which the epoxy resin is a mixture containing at least 5% by weight of aromatic polyether containing oxirane functionality which is consumed by reaction with the acidic copolymer. The acidic copolymer is solution copolymer of monoethylenically unsaturated monomers comprising at least about 20% of monoethylenic carboxylic acid, based on the total weight of monomers, and the epoxy resin mixture constitutes at least about 40% of the total resin solids content and provides oxirane functionality in a stoichiometric deficiency with respect to carboxyl functionality in the acidic copolymer of from 1:2 to 1:20. At least a portion of carboxyl functionality in the copolymer-epoxy resin hydroxy ester reaction product is reacted with a base to render the reaction product self-emulsifiable in water. An aminoplast or phenoplast resin in small proportion may be used to enhance the cure on baking.

In order to provide the best properties, the average molecular weight of the mixture of aromatic polyethers constituting the epoxy resin should be as high as possible and the proportion of diepoxide present in the mixture should also be as high as possible. The high molecular weight introduces problems of incompatibility which can only be resolved by reacting a considerable proportion of oxirane functionality, and this leads to gelation.

The preferred epoxy resins have an average molecular weight of at least 1,500. Molecular weights are determined by gel permeation chromatography (GPC) according to ASTM 3536-76 or ASTM 3596-80. Such high molecular weight aromatic polyethers are incompatible with carboxyl-functional addition polymers. Thus, while both materials may be soluble in the same organic solvent, the solutions do not dissolve in one another and tend to separate. These high molecular weight epoxides provide the best properties if they can be used in a compatible form. Also, epoxy resins containing at least about 5% by weight of diepoxides, usually as diglycidyl ethers, function to increase the molecular weight of the copolymers to provide the best properties, but substantially complete esterification of the oxirane groups by the carboxyl groups in the copolymer leads to gelation. The most difficult situations combine high molecular weight epoxy resins with a high proportion of diepoxide, but these provide the best results.

In the preferred situation, the epoxy resin includes aromatic polyethers devoid of oxirane functionality, together with a mixture of monoepoxides and diepoxides. It is desired to chemically couple together with the carboxyl copolymer as much epoxide as possible and the inclusion of monoepoxide is helpful. The overall perspective is the same, namely, the more epoxide, monoepoxide or diepoxide, the more total aromatic polyether can be chemically combined with the carboxyl copolymer. The maximum proportion of epoxide, especially diepoxide, is limited in the absence of this invention. More particularly, without this invention, gelation occurs using the molecular weight and oxirane functionality which is desired, but this gelation is avoided herein. The high molecular weight and complexity of the copolymers formed herein lowers the proportion of curing agent needed, and this provides tougher and more impact resistant cured coatings. Indeed, considerable solvent resistance is obtained in the absence of curing agent, so it can be omitted.

The solvent-soluble carboxyl-functional polymer may be of diverse chemical type, but it is preferably a solution copolymer of monoethylenically unsaturated monomers comprising at least about 20% of monoethylenically unsaturated carboxylic acid, based on the total weight of monomers. These solution copolymers are themselves well known, being unusual in this invention solely because of the large amount of copolymerized carboxylic acid. The balance of the copolymer is preferably nonreactive under the contemplated conditions of polymerization, prereaction with the epoxy resin, and cure, but small amounts of other reactive monomers may be tolerated, such as hydroxy monomers illustrated by 2-hydroxy ethyl methacrylate, amide monomers illustrated by acrylamide, or N-methylol monomers illustrated by N-methylol acrylamide.

The nonreactive monomers are illustrated by acrylate and methacrylate esters, such as ethyl acrylate, methyl methacrylate or isbutyl methacrylate, styrene or vinyl toluene, vinyl acetate, vinyl chloride, vinylidene chloride, acrylonitrile, and the like. Their function herein is to enhance solvent solubility and film formation.

The carboxyl-functional monomer should be present in large proportion so as to provide excess carboxyl functionality, as will be discussed. The preferred minimum proportion is 30% of the weight of monomers. Methyacrylic acid provides the best hydrolytic stability and is very much preferred, but other acids are also useful, such as fumaric acid, acrylic acid, crotonic acid, itaconic acid, and the like. Up to about 80% of the monomers may be carboxyl-functional, but the maximum proportion is more generally determined by retention of solvent solubility.

In this invention the solution copolymer is preformed and reacted with the epoxy resin in the presence of an esterification catalyst, a reaction which would normally lead to gelation. It is frequently desired that the final esterification product include aromatic polyether devoid of oxirane functionality which is not combined by esterification with carboxyl-functional polymer. This is preferably achieved using an epoxy resin which is a mixture of aromatic polyethers devoid of oxirane functionality together with aromatic polyethers having one or two oxirane groups. This procedure maximizes compatibility. However, the aromatic polyether devoid of oxirane functionality can be omitted, or it can be added after esterification is complete in which case the mixture can be heated and agitated to enhance the intimacy of the association between the various components.

The copolymer must be made in organic solvent solution so that it is nongelled and organic solvent-soluble.

The epoxy resin component in the final copolymer composition is a mixture containing at least 5% by weight of aromatic polyether containing oxirane functionality and at least 5% by weight of aromatic polyether devoid of oxirane functionality.

Aromatic polyethers, and particularly diglycidyl ethers thereof are well known and available in commerce. The usual aromatic polyether backbone of the epoxy resin is based on a bisphenol with defines a pair of phenolic groups joined together through an intervening divalent hydrocarbon. The preferred bisphenols have the formula:

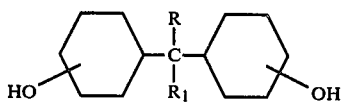

in which R and R1 are alkyl groups containing up to 8 carbon atoms. Bisphenol A is particularly preferred, this compound having the two OH groups in the para position and R and R1 are each methyl.

The epoxy resins which are used herein possess hydroxy groups in addition to epoxy groups, and the higher the molecular weight, the more hydroxy groups are present. In addition, and when the epoxy resin is defunctionalized in order to reduce the proportion of diepoxide therein, additional hydroxy groups are provided. These hydroxy groups may participate in the final curing reaction.

The usual epoxy resins available in commerce are made by reaction of epichlorohydrin with Bisphenol A and have a molecular weight in the range of about 350 to 6,000 and comprise or consist of diglycidyl ethers.

Mixtures having an average molecular weight of at least about 1,500 and containing less than about 50% by weight diglycidyl ethers are preferred for use herein, and a simple way of providing this is by reacting a lower molecular weight diglycidyl ether with between 1 and 2 molar proportions of a bisphenol. This increases molecular weight and may provide bisphenol terminal groups. It is preferred to use a mixture containing from 10% to about 95% by weight of aromatic polyethers which are diglycidyl ethers. It is surprising to be able to combine the higher molecular weight epoxy resins preferred herein with preformed copolymers to provide nongelled compositions which do not separate on standing, and this is particularly true where the weight proportion of the epoxy resin which is present is large. It is especially surprising when a proportion of the epoxy resin is devoid of oxirane functionality so that compatibility by coreaction with this component cannot be expected. At least 10% of the aromatic polyethers in the epoxy resin are desirably devoid of oxirane functionality. When about 40% to 90% of the aromatic polyethers are diglycidyl ethers, good solvent resistance is obtained without external curing agents.

Defunctionalization of the epoxy resin can be performed in various ways. Reaction with a phenol, particularly a bisphenol has been mentioned previously. Basic catalysts are normally used in this reaction. Similarly, one can use a carboxylic acid, such as benzoic acid or octanoic acid, to defunctionalize the epoxy resin, basic catalysts being again appropriate. In addition, alcohols can be used, such as octanol, and the etherification reaction with alcohol is fostered by the presence of a catalyst such as boron trifluoride.

With reference to preferred compositions, the epoxy resin is a mixture of bisphenolic polyethers, at least 10% of which contain oxirane functinality, and at least 10% of which are devoid of oxirane functionality. At least 5% of the total bisphenolic polyethers are provided by diglycidyl ethers. As previously indicated, these bisphenolic polyethers are of relatively high molecular weight, possessing an average molecular weight of at least 1500. The acidic copolymer which combined with the epoxy resin is a solution copolymer of about 30-70% of methacrylic acid, the balance of the monomers being nonreactive as previously defined, the proportions being based on total resin solids. The epoxy resin mixture constitutes from 50-80% of the total resin solids content, and it provides oxirane functionality in a stoichiometric deficiency with respect to carboxyl functionality of from 1:4 to 1:10. From about 30% to about 90% of the carboxyl functionality in the polymer product is reacted with a volatile amine which may be ammonia, or other volatile amine, such as triethyl amine or preferably dimethylamino ethanol.

The carboxyl-functional polymers which are preferred generally have an average molecular weight in the range of 5,000 to 20,000 preferably 7,000-15,000. Molecular weight can be controlled by solids content during polymerization, or catalyst concentration, or polymerization temperature, these being known expedients for this purpose. Mercaptan chain termination is preferably avoided since sanitary can use is contemplated and mercaptans are bad smelling materials.

The esterification reaction involving the oxirane groups of the epoxy resin and carboxyl functionality is a conventional reaction which is normally carried out in the presence of a small amount of an amine esterification catalyst. An appropriate catalyst is dimethyl ethanolamine, but many others are known. These catalysts are normally used in an amount of from 0.1–0.3% of the materials subjected to esterification, 0.2% being typical. Up to about 2% of catalyst is broadly contemplated by the art, but rarely used because it would be thought to be a waste of material. Unfortunately, conventional practice produces a gelled product. From the standpoint of gelation theory, gelation normally results when there is present more than one equivalent of oxirane functionality in a difunctional epoxide molecule per molecule of carboxyl-functional polymer, and it is frequently desired to exceed this level of use, it being appreciated that all the detactable oxirane is consumed herein.

In accordance with the present invention, this difficult esterification reaction is carried in organic solvent medium in the presence of greater than 2% of an amine esterification catalyst, based on the weight of the reactants subjected to esterification. The use of dimethyl ethanolamine as a typical amine esterification catalyst has previously been mentioned, but diverse other amines can be used in the esterification reaction. Other amine esterification catalysts are illustrated by dimethyl benzyl amine, ethanol amine, diethanol amine and morpholine. The choice of amines possessing superior capacity to catalyze the conventional esterification of a carboxylic acid with an epoxy group is itself a matter of common knowledge in the art.

Up to about 15% by weight of amine esterification catalyst can be used, but it is preferred to employ about 4% to about 10%. The maximum proportion of catalyst is not critical, but there is a natural desire to avoid the use of an unnecessary excess.

The esterification reaction is carried out in organic solvent medium. The solvents are subject to wide variation, so long as they do not interfere with the achievement of an emulsion when the acidic copolymer salts are diluted with water. The fact of achieving an emulsion is easily observed by the fact that the aqueous system which is produced is milky, and not clear. Organic solvents of limited water miscibility, such as xylene, toluene, and butanol are useful, and they may be used alone or together with water miscible solvents, such as 2-ethoxy ethanol or methyl ethyl ketone. Alcoholic solvent mediums are preferred.

The solids content of the solution containing the two resins which are combined by esterification is conveniently from 40% to 75%, more preferably from 55% to 70%. As little solvent as possible is desired to minimize the solvent content of the final aqueous emulsions, and the less solvent, the greater the danger of gelation.

An elevated esterification temperature sufficient to cause the oxirane functionality to react with the carboxyl functionality is used and is maintained until the oxirane functionality is substantially entirely consumed. Generally, temperatures of from about 60° C. to about 130° C. are useful, but higher temperature speeds the reaction. Esterification of the hydroxy groups is to be avoided during polymer preparation, so water or solvent vapors are not removed and excessive temperature is avoided. The esterification temperature is entirely conventional.

It is desired to point out that the large proportion of amine esterification catalyst functions to avoid gelation in a fashion which is not fully understood and that the ester product is different from that which is normally obtained using material selection and proportions which do not produce gelation.

It is possible that the large amount of amine causes salt formation with the carboxyl groups present which leads to the formation of colloidal particles in the solvent medium as the esterification reaction increases the molecular weight. This withdraws material from solution before it can gel and may provide the reason why systems which theoretically should form a useless gel, do not do so. In any event, the usual nongelled products are clear compatible solutions. The products herein, when the systems esterified tend to gel, are colloidal dispersions as can be observed by noting their cloudy appearance.

The coating composition of this invention is primarily useful for coating aluminum, tinplated steel, pretreated metals, steel, or metals coated with the same or different resin composition (i.e., a second coat). These aqueous compositions can be used, however, for coating other substrates, such as wood. The most preferred and useful use of the coating compositions is for the interior coating of metal containers that will come in contact with food or beverages. Coating can be done by any coating procedure well known to those skilled in the art, including direct roll coating, reverse roll coating, electrodeposition, spraying, flow coating, and the like. The preferred method, however, in coating the interior of metal containers is by spraying. After coating the substrate, the coating is baked for about 5 seconds to about 30 minutes between about 250° F. to 600° F. A typical bake is for about 2 minutes at about 400° F.

The present invention further provides a nongelled hydroxy ester copolymer composition substantially free of oxirane functionality comprising an acidic copolymer-epoxy resin hydroxy ester reaction product, the epoxy resin being a mixture containing at least 5% by weight of aromatic polyether which is difunctional in oxirane functionality which is consumed by reaction with the acidic copolymer and the acidic copolymer being a solution copolymer of monoethylenically unsaturated monomers comprising at least about 20% of monoethylenically unsaturated carboxylic acid, based on the total weight of monomers, the epoxy resin mixture constituting at least about 40% of the total resin solids content and providing oxirane functionality in a stoichiometric deficiency with respect to carboxyl functionality in the acidic copolymer of from 1:2 to 1:20, at least a portion of the carboxyl functionality in the copolymer-epoxy resin hydroxy ester reaction product being reacted with a base to render the reaction product self-emulsifiable in water.

Epoxy resins contain a plurality of aromatic groups joined together by ether linkages, and hence provide excellent physical and chemical properties. It has been difficult to employ such resins in aqueous medium because they lack storage stability. This is of particular importance when spray application is contemplated, especially for the interior of sanitary cans. The slightest change in the pH of the aqueous composition as a result of hydrolytic instability results in a marked change in the viscosity and application properties of the coating.

Moreover, and in order to employ aqueous coatings of higher resin solids content at the desired viscosity, it has been necessary to employ an emulsion system in which a water immiscible component is suspended in an aqueous continum by means of an emulsifying agent. These emulsion systems are intrinsically unpredictable since the particle size of the emulsion will vary with the agitation of the composition. In this invention we provide a self-emulsifiable composition in which the particle size of the emulsion is substantially the same regardless of whether high speed agitation is used or whether the mixture with water is barely stirred.

The chemical similarity between the oxirane-free hydroxy-functional aromatic polyether which is emulsified, and the hydroxy-functional aromatic polyether epoxides which are incorporated by hydroxy ester formation into the carboxylfunctional copolymer salt which serves as an emulsifying agent is believed to contribute to the achievement of a self-emulsifiable composition.

The preferred epoxy resins have an average molecular weight of at least 1,500. Such high molecular weight aromatic polyethers are imcompatible with carboxyl-functional addition polymers. Thus, while both materials may be soluble in the same organic solvent, the solutions do not dissolve in one another and tend to separate. These high molecular weight epoxides provide the best properties, but while lower molecular weight epoxides yield compatible solutions, the higher molecular weight epoxides do not. Substantially complete esterification of the oxirane groups by the carboxyl groups in the copolymer eliminates this incompatibility.

The use of mixtures of monoepoxides and diepoxides is important. It is desired to chemically couple together with the carboxyl copolymer as much epoxide as possible. Some of this epoxide is desirably a diepoxide in order to increase the molecular weight and complexity of the final copolymer. However, the more monoepoxide, the more total aromatic polyether can be chemically combined with the carboxyl copolymer. The maximum proportion of diepoxide is subject to many variables and the only limit is the avoidance of gelation, so this factor will be defined by the term "nongelled." The high molecular weight and complexity of the copolymers formed herein lowers the proportion of curing agent needed, and this provides tougher and more impact resistant cured coatings.

A further point of considerable importance is the selection of bisphenol-terminated aromatic polyethers to constitute the oxirane-free polyether which finds its way into the discontinuous phase of the emulsion. These possess superior hydrolytic stability in aqueous alkaline medium and the final cured products possess the best properties. On the other hand, defunctionalization of the epoxy resin may be carried out in many different ways, and this invention is not limited to any particular defunctionalization mechanism.

One main component of the final copolymer composition is a solution copolymer of monoethylenically unsaturated monomers comprising at least about 20% of monoethylenically unsaturated carboxylic acid, based on the total weight of monomers. These solution copolymers are themselves well known, being unusual in this invention solely because of the large amount of copolymerized carboxylic acid. The balance of the copolymer is preferably nonreactive under the contemplated conditions of polymerization, prereaction with the epoxy resin, and cure, but small amounts of other reactive monomers may be tolerated, such as hydroxy monomers illustrated by 2-hydroxy ethyl methacrylate, amide monomers illustrated by acrylamide, or N-methylol monomers illustrated by N-methylol acrylamide.

The nonreactive monomers are illustrated by acrylate and methacrylate esters, such as ethyl acrylate, methyl methacrylate or isobutyl methacrylate, styrene or vinyl toluene, vinyl acetate, vinyl chloride, vinylidene chloride, acrylonitrile, and the like. Their function herein is to enhance solvent solubility and film formation.

The carboxyl-functional monomer in large proportion is essential. The preferred minimum proportion is 30% of the weight of monomers. Methacrylic acid provides the best hydrolytic stability and is very much preferred, but other acids are also useful, such as fumaric acid, acrylic acid, crotonic acid, itaconic acid, and the like. Up to about 80% of the monomers may be carboxyl functional, but the maximum proportion is more generally determined by retention of solvent solubility.

In preferred practice, the solution copolymer is preformed and reacted with the epoxy resin mixture in the presence of an esterification catalyst, but this is not essential. Thus, copolymerization and coreaction with the epoxy resin mixture under esterification conditions is also possible, or one can add the esterification catalyst after copolymerization is complete in the epoxy resin system. Similarly, the unsaturated acid can be prereacted with epoxy resin and the copolymerization can be carried out with the mixture of unsaturated epoxy-ester and unreacted unsaturated acid.

Another procedural variation is the introduction of the aromatic polyether which is devoid of oxirane functionality. In preferred practice the epoxy resin which is reacted with the copolymer is a mixture including aromatic polyether devoid of oxirane functionality as well as aromatic polyether having a single oxirane group and aromatic polyether having two oxirane groups. This procedure maximizes compatability. However, the aromatic polyether devoid of oxirane functionality can be added later, and the mixture can be heated and agitated to enhance the intimacy of the association between the various components.

The copolymer must be made in solution so that it is nongelled and organic solvent-soluble.

The epoxy resin component in the final copolymer composition is a mixture containing at least 5% by weight of aromatic polyether containing oxirane functionality and at least 5% by weight of aromatic polyether devoid of oxirane functionality.

Aromatic polyethers, and particularly diglycidyl ethers thereof are well known and available in commerce. The usual aromatic polyether backbone of the epoxy resin is based on a bisphenol which defines a pair of phenolic groups joined together through an intervening divalent hydrocarbon. The preferred bisphenols have the formula identified hereinabove on specification page 5, in which R and R1 are alkyl groups containing up to 8 carbon atoms. Bisphenol A is particularly preferred, this compound having the two OH groups in the para position and R and R1 are each methyl.

The epoxy resins which are used herein possess hydroxy groups in addition to epoxy groups, and the higher the molecular weight, the more hydroxy groups are present. In addition, and when the epoxy resin is defunctionalized in order to reduce the proportion of diepoxide therein, additional hydroxy groups are provided. These hydroxy groups may participate in the final curing reaction.

The usual epoxy resins available in commerce are made by reaction of epichlorohydrin with Bisphenol A and have a molecular weight of at least about 1,500 and containing less than about 50% by weight of diglycidyl ethers are preferred for use herein, and a simple way of providing this is by reacting a lower molecular weight diglycidyl ether with between 1 and 2 molar proportions of a bisphenol. This increases molecular weight and provides bisphenol terminal groups. It is especially preferred to use a mixture containing from 3% to about 30% by weight of diglycidyl ethers. The molecular weight of the epoxy resins is normally obtained by calculation. It is particularly suprising to be able to combine the higher molecular weight epoxy resins preferred herein with preformed copolymers to provide non-gelled compatible compositions, and this is particularly true where the proportion of the epoxy resin which is present is large with a large proportion of it devoid of oxirane functionality so that compatibility by coreaction is not possible. At least 25% of the epoxy resin should be devoid of oxirane functionality.

Defunctionalization of the epoxy resin can be performed in various ways. Reaction with a phenol, particularly a bis-phenol has been mentioned previously. Basic catalysts are normally used in this reaction. Similarly, one can use a carboxylic acid, such as benzoic acid or octanoic acid, to defunctionalize the epoxy resin, basic catalysts being again appropriate. In addition, alcohols can be used, such as octanol, and the etherification reaction with alcohol is fostered by the presence of a catalyst such as boron trifluoride.

The esterification reaction involving the oxirane groups of the epoxy resin and carboxyl functionality is a conventional reaction which is normally carried out in the presence of a small amount of an amine esterification catalyst. An appropriate catalyst is dimethylamino ethanol, but many others are known. These catalysts are normally used in an amount of from 0.1–2% of the materials subjected to esterification.

From the standpoint of a curing agent, one can use aminoplast resins, phenoplast resins, or mixtures thereof. While the compositions of this invention form films with reasonably good properties on baking in the absence of any external curing agent, from 1–25% of the curing agents noted hereinbefore will serve to enhance the cure. One would normally need at least 15% of curing agent, based on the total weight of resin, and this embraces the proportions which are useful herein. On the other hand, this invention is unusual in enabling the achievement of a superior cure using a smaller proportion of curing agent, from 2–12% being entirely appropriate. The smaller the proportion of curing agent needed to provide the desired solvent insolubility, the less brittleness is introduced into the cured film.

The preferred curing agents are water dispersible. These will be illustrated by hexamethoxy methyl melamine, or by A stage phenol-formaldehyde resols. On the other hand, the compositions of this invention are emulsions, so water dispersibility in the curing agent is not essential.

It will be appreciated that the cure is by baking, and is entirely conventional, the methylol groups introduced by the curing agent reacting with the hydroxy and carboxyl groups present in the copolymer, and with the hydroxy groups present in the aromatic polyether devoid of oxirane functionality. It will also be appreciated that acidic curing agents are commonly employed to facilitate the cure, though this is not essential, especially when a phenoplast curing agent is used.

With reference to preferred compositions, the epoxy resin is a mixture of bisphenolic polyethers, at least 10% of which contain oxirane functionality, and at least 10% of which are devoid of oxirane functionality. At least 3% of the total bisphenolic polyethers are provided by diglycidyl ethers. As previously indicated, these bisphenolic polyethers are of relatively high molecular weight, possessing an average molecular weight determined by calculation of at least 1500. The acidic copolymer which is combined with the epoxy resin is a solution copolymer of about 30–70% of methacrylic acid, the balance of the monomers being nonreactive as previously defined, the proportions being based on total resin solids. The epoxy resin mixture constitutes from 55–90% of the total resin solids content, and it provides oxirane functionality in a stoichiometric deficiency with respect to carboxyl functionality of from 1:4 to 1:10. From about 30% to about 90% of the carboxyl functionality in the polymer product is reacted with a volatile amine which may be ammonia, or other volatile amine, such as triethyl amine or, preferably, dimethylamino ethanol.

The carboxyl-functional polymers which are preferred generally have an average molecular weight in the range of 5,000 to 20,000, preferably 7,000–15,000. Molecular weight can be controlled by solids content during polymerization, or catalyst concentration, or polymerization temperature, these being known expedients for this purpose. Mercaptan chain termination is preferably avoided since sanitary can use is contemplated and mercaptans are bad smelling materials.

Lastly, and in preferred practice, from about 3% to about 10% of water dispersible aminoplast resin is added to the mixture.

It will be observed that the preferred epoxy resins are solids, and they are used by dissolving them in a volatile organic solvent. The solvents are subject to wide variation, so long as they do not interfere with the achievement of an emulsion when the acidic copolymer salts are diluted with water. The face of achieving an emulsion is easily observed by the fact that the aqueous system which is produced is milky, and not clear. Organic solvents of limited water miscibility, such as xylene, toluene, and butanol are useful, and they may be used alone or together with water miscible solvents, such as 2-ethoxy ethanol or methyl ethyl ketone.

The aqueous coating compositions of this invention are primarily useful for coating aluminum, tinplated steel, pre-treated metals, steel, or metals coated with the same or different resin composition (i.e., a second coat). These aqueous compositions can be used, however, for coating other substrates, such as wood. The most preferred and useful use of the coating compositions is for the interior coating of metal containers that will come in contact with food or beverages because these coatings are water resistant, possess low extractables, and are very impermeable so as to avoid modification of the natural taste or odor of the foods and beverages stored within the can.

Coating can be done by any coating procedure well known to those skilled in that art, including direct roll coating, reverse roll coating, electrodeposition at the anode, spraying, flow coating, and the like. The preferred method, however, in coating the interior of metal containers is by spraying using enough amine for salt formation with from 50% to 90% of the available carboxyl groups, and enough water to provide a final solids content of about 18% to about 25%. After coating the substrate, the coating is baked for about 5 seconds to about 30 minutes at between about 250° F. and about 600° F. A typical bake is for about 2 minutes at 400° F.

EXAMPLE 1

(1) An epoxy acrylic composition was produced in accordance with this invention as follows:

| | Ingredient | Grams |
|---|---|---|
| A | Liquid epoxy resin (D.E.R. 333) | 4144 |
| | Bisphenol A | 2135 |
| | Ethylene glycol monobutyl ether | 1109 |
| B | Ethylene glycol monobutyl ether | 1012 |

Ingredients from part A were charged to a 12-liter round bottom flask fitted with a thermometer, nitrogen sparge tube, stirrer and condenser. The flask was then evacuated to about 15 inches of mercury and then the vacuum was broken with a nitrogen sparge. This step was repeated 2 more times. The nitrogen sparge was then set to about 200 cc/min. and the reactants were then heated to about 130° C. Batch temperature of 130° C. was held for about 1 hour, whereupon the temperature was raised to about 175° C. to achieve reflux. A small water trap was inserted in the system to remove a small amount of water. The batch was held at about 175° C. to obtain a viscosity of about Z to $Z_1$ at 40% N.V. in ethylene glycol monobutyl ether. The part B was added and the batch cooled to provide a product at 74.75% N.V. with an oxirane content of 0.44%.

(2) An acrylic resin was separately prepared as follows:

| | Ingredient | Grams |
|---|---|---|
| A | n-Butanol | 5503 |
| B | Methacrylic acid | 1764 |
| | Styrene | 924 |
| | Ethyl acrylate | 26 |
| | Benzoyl peroxide | 182 |

Part A was charged to a 12-liter flask fitted with a stirrer, thermometer, condenser and a nitrogen blanket tube. The nitrogen blanket was turned on and the n-butanol heated to reflux, about 113° C. Part B was then metered into the flask at a uniform rate over a period of about 2.3 hours. Thereafter, the reaction mixture temperature was raised to about 115° C. and held for about 3 hours. The mixture was then cooled to room temperature. This mixture had a nonvolatile content of 34.26% and an acid number of 372.

(3) An epoxy acrylate polymer solution was prepared as follows:

| | Ingredient | Grams |
|---|---|---|
| A | Epoxy polymer solution (prepared above) | 2270 |
| | Acrylic polymer solution (prepared above) | 1230 |
| B | Ethylene glycol monobutyl ether | 251 |
| C | Dimethylaminoethanol | 198 |

Part A was charged to a 5-liter round bottom flask fitted with a stirrer, thermometer and condenser and heated to about 100° C. Parts B and C were then added and the reaction temperature rose to 104° C. over half an hour at which time 1975 grams of the reaction mixture was poured out of the flask into 2225 grams of demineralized water which has been heated to 62° C.

This resulted in a stabilized emulsion with the following characteristics: nonvolatile content 27.1%, 15 second viscosity on a No. 4 Ford Cup, pH of 7.6 and an acid number of 43.3 on solids.

The remaining material in the flask had 2225 grams demineralized water added to it with agitation. This produced a stable emulsion with the following characteristics: N.V. content of 26%, 15 second viscosity on a No. 4 Ford Cup, pH of 7.6 and an acid number of 44 on solids. The epoxy-acrylic ratio is 80/20.

EXAMPLE II (1) An epoxy polymer solution was prepared in the following manner:

| | Ingredient | Grams |
|---|---|---|
| A | Liquid epoxy resin (Epon 828) | 1712 |
| | Bisphenol A | 921 |
| | Ethylene glycol monobutyl ether | 538 |
| B | Sodium acetate | 0.79 |
| | Demineralized water | 5 |
| C | n-Butanol | 818 |

Part A was charged to a 5-liter round bottom flask fitted with a stirrer, thermometer, nitrogen sparge tube and condenser. This mixture was heated to about 85° C. and part B was then added to the flask. The temperature of this mixture was then raised to about 175° C. and held at about 175° C. for about 5 hours.

After the 5 hour hold the reaction mixture has a viscosity of about Y-Z at 40% N.V. in ethylene glycol monobutyl ether. The product was then cooled and part C was added slowly. The final N.V. was 65.9%.

(2) An acrylic polymer solution was produced by the following method:

| | Ingredient | Grams |
|---|---|---|
| A | Ethylene glycol monobutyl ether | 843 |
| | n-Butanol | 843 |
| B | Styrene | 444 |
| | Methacrylic acid | 849 |
| | Ethyl acrylate | 12 |
| | Benzoyl peroxide | 112 |

Part A was charged to a 5-liter round bottom flask fitted with a stirrer, thermometer, nitrogen blanket inlet and a condenser and heated to about 120° C. Part B was then added at a uniform rate over about 2.5 hours. This reaction was held 3 hours at about 120° C. and then cooled. This gave a product having a non-volatile content of 48.0%.

An epoxy acrylate polymer solution is prepared as follows:

| | Ingredient | Grams |
|---|---|---|
| A | Epoxy polymer solution (Prepared above) | 1708 |
| | Acrylic polymer solution (Prepared above) | 671 |
| B | Dimethylaminoethanol | 94.9 |

Part A was charged to a 5-liter round bottom flask fitted with a stirrer, thermometer, nitrogen inlet tube, and condenser. This was then heated to about 100° C. and part B was added. The temperature was held at about 100° C. for about 4 hours. Then 2000 grams of this mixture was added to 1250 grams demineralized water with agitation. After the 2000 grams were added an additional 520 grams demineralized water was added to the previously formed emulsion. The final product exhibited the following characteristics: N.V. of 33.1%, viscosity on No. 4 Ford Cup of 25 seconds, acid number of 65.9 based on N.V. and 68.09 milliequivalents of base per 100 grams resin (MEQ).

EXAMPLE III (1) In a manner similar to Example II an epoxy polymer solution was prepared as follows:

| | Ingredient | Grams |
|---|---|---|
| A | Epoxy resin D.E.R. 333) | 1711.5 |
| | Bisphenol A | 921 |
| | Ethylene glycol monobutyl ether | 465 |
| B | Ethylene glycol monobutyl ether | 93 |
| | n-Butanol | 817.5 |

Part A was charged to a 5-liter round bottom flask fitted with an agitator, thermometer and nitrogen sparge tube. This mixture was then heated under a vacuum of about 20 inches of mercury to about 145° C. and about 58 grams of distillate was removed. The vacuum was then broken with nitrogen and the mixture heated to about 175° C. and held for about 2.2 hours. The mixture was then cooled and part B added during cooling.

(2) An acrylic polymer solution was prepared in the following manner:

| | Ingredient | Grams |
|---|---|---|
| A | Ethylene glycol monobutyl ether | 843 |
| | n-Butanol | 843 |
| B | Styrene | 444 |
| | Methacrylic acid | 849 |
| | Ethyl acrylate | 12 |
| | Benzoyl peroxide | 112 |

Part A was charged to 5-liter round bottom flask fitted with a stirrer, thermometer and nitrogen blanket tube and then heated to about 123° C. Part B was then added over a period of about 2 hours at a temperature of about 120° C. This mixture was then held at a temperature of about 117° C. for about 4.5 hours and then cooled.

(3) An epoxy acrylate polymer solution was prepared as follows:

| | Ingredient | Grams |
|---|---|---|
| A | Epoxy polymer solution (Prepared above) | 805 |
| | Acrylic polymer solution (Prepared above) | 310 |
| B | Dimethylaminoethanol | 63 |
| C | Diminerlized water | 1418 |

Part A was charged to a 3-liter round bottom flask fitted with an agitator, thermometer and nitrogen blanket tube and heated to 102° C. Part B was then added dropwise over about 15 minutes. This mixture was then held at about 105° C. for approximately 5 hours. Part C was then added to the flask over a period of about 45 minutes and was cooled simultaneously. This resulted in a stable emulsion with the following characteristics: N.V.=25.9%, viscosity on No. 4 Ford Cup=16 seconds, acid number on N.V.=48.3, MEQ-100.4.

EXAMPLE IV

An acrylic polymer solution is prepared as follows:

| | Parts by Weight |
|---|---|
| Ethylene glycol monobutyl ether | 2476.0 gms |
| Methacrylic acid monomer | 2766.4 gms |
| Styrene monomer | 2766.4 gms |
| Ethyl acrylate monomer | 291.2 gms |
| Tertiary butyl peroxyl isopropyl carbonate | 388.3 gms |
| Total | 8688.3 gms |

All of the above components are premixed in a mixing vessel. 1464.8 gms of the premix are added to a reactor equipped with a stirrer, reflux condenser, thermometer, addition funnel and nitrogen inlet. The nitrogen flow is started and the batch is heated to 120° C. The remaining 7223.5 gms of the premix are added via the addition funnel over a three hour period. Temperature is maintained at 120° C. The batch is held for an additional two hours at 120° C. after which the batch is cooled to room temperature. The resulting acrylic polymer solution has a solids content of 71%. The acrylic polymer has a composition of methacrylic acid/styrene/ethyl acrylate in the weight ration of 47.5/47.5/5/5. The polymer has an acid number of 300.

The epoxy acrylate polymer solution is prepared as follows:

| | Parts by Weight |
|---|---|
| Ethylene glycol monobutyl ether | 67.0 gms |
| n-Butanol | 200.0 gms |
| Acrylic polymer solution (prepared above) | 432.0 gms |
| Dimethylaminoethanol | 60.0 gms |
| Epon 1007 epoxy resin | 480.0 gms |
| Total | 1239.0 gms |

The 67 gms ethylene glycol monobutyl ether and the 200 gms of n-butanol are charged to a reaction vessel equipped with a stirrer, reflux condenser, thermometer and a nitrogen inlet. The nitrogen flow is started and the solvents are heated to slow reflux at 126° C. The acrylic polymer solution is added and dissolved. The dimethylaminoethanol catalyst is added and stirred until uniform. The Epon 1007 solid epoxy resin is added and dissolved. Epon 1007 is a solid epoxy resin manufactured by Shell Chemical Company and characterized by Y-Z, Gardner-Holdt viscosity in butyl dioxitol at 40% solids, 2000–2500 epoxide equivalent and 5 maximum Gardner Color.

The batch is held for 1.5 hours at 126° C. The batch does not gel but forms an epoxy acrylate polymer solution. The polymer composition is epoxy/acrylic 61/39 by weight. The polymer has an acid number of 77, and an oxirane content less than 0.01 meq/gm. This is the smallest detectable amount in the test utilized. The polymer solution has a solids content of 63%.

It is desired to stress that the dimethylaminoethanol catalyst has been employed in a much larger than normal proportion, namely, 7.6% by weight, based on the total weight of materials subjected to the esterification reaction. These materials are the acrylic polymer and the epoxy resin. The reaction conditions are such as to promote reaction between the oxirane groups in the Epon 1007 and the carboxyl groups in the acrylic polymer, and these two components are the material subjected to esterification. In contrast, a repeat of this Example IV utilizing 1.6 grams of dimethylaminoethanol (a normal proportion of esterification catalyst corresponding to 0.2% by weight, based on the materials subjected to esterification) causes the formation of a useless gel in about 25 minutes after the addition of Epon 1007 is completed. With the larger proportion of amine catalyst which avoids gelation, a 25 minute reaction at 126° C. does not result in gelation and the reaction can be continued to completely consume the oxirane functionality.

A water dispersion of the nongelled epoxy acrylate polymer solution is prepared as follows:

|  | Parts by Weight |
| --- | --- |
| Epoxy acrylate polymer solution (prepared above) | 794.0 gms |
| Deionized water | 918.0 gms |
| Total | 1712.0 gms |

The epoxy acrylate polymer solution prepared above is heated to 100° C. and placed into a dispersion vessel equipped with an agitator. Agitation is started and the deionized water is added over a 15 minute period. No attempt is made to maintain the temperature of the batch at 100° C. The temperature of the batch after the water addition is 35° C. and is further cooled to room temperature. The dispersion is stable and has the following physical properties: 29.2% solids, 7.7 pH, 165 centipoise viscosity (Brookfield 1 spindle, 6 RPM), 0.13 micron particle size, and 27% by volume organic volatiles.

The epoxy acrylate dispersion prepared above is modified by blending with a melamine resin (Cymel 370, American Cyanamid Co.) at the ratio of 2.5 gms melamine resin per 100 gms dispersion. Films of the above are cast on aluminum and tin plate with wire-wound bars. The coated panels are baked in a forced air oven at 400° F. for 75 seconds total time. The dry films are 0.1 mil thick, are clear and high gloss and exhibit excellent properties as shown below.

|  | Substrate | |
| --- | --- | --- |
|  | Aluminum | Tin Plate |
| Methyl ethyl keton double rubs | 200 | 200 |
| Dry adhesion | 10 | 10 |
| Pasteurization blush | 10 | 10 |
| Pasteurization adhesion | 10 | 10 |
| Wedge bend flexibility (Rating: 10 = no failure, 0 = complete failure) | 4 | 5 |

EXAMPLE V

An acrylic polymer solution is prepared as follows:

|  | Parts by Weight |
| --- | --- |
| Ethylene glycol monobutyl ether | 451.7 gms |
| Ethylene glycol monohexyl ether | 47.6 gms |
| n-Butanol | 451.7 gms |
| Isopropanol | 349.0 gms |
| Methacrylic acid monomer | 1045.0 gms |
| Styrene monomer | 1045.0 gms |
| Ethyl acrylate monomer | 110.0 gms |
| Benzoyl peroxide (70% in water) | 220.0 gms |
| Benzoyl peroxide (70% in water) | 20.0 gms |

-continued

|  | Parts by Weight |
| --- | --- |
| Total | 3740.0 gms |

Ethylene glycol monobutyl ether, ethylene glycol monohexyl ether, n-butanol and isopropanol are charged to a reaction vessel equipped with a stirrer, reflux condenser, Dean Stark trap, thermometer, addition funnel and nitrogen inlet. The methacrylic acid monomer, styrene monomer, ethyl acrylate monomer and 220 gms benzoyl peroxide are premixed in a mixing vessel. 460 gms of this premix are added to the reactor, the remaining 1960 gms are placed into the addition funnel. The nitrogen flow is started and the batch is heated to 90° C. The remaining 1960 grams of premix is added over three hours. The batch is held for an additional one hour at 90° C. 20 gms benzoyl peroxide are added and the batch is held at 90° C. for two hours. The batch is cooled to room temperature. The resulting acrylic polymer solution has a solids content of 63.4%. The acrylic polymer has the composition methacrylic acid/styrene/ethyl acrylate 47.5/47.5/5 by weight and an acid number of 279.7.

A partially defunctionalized epoxy resin is prepared as follows:

|  | Parts by Weight |
| --- | --- |
| Epon 829 liquid epoxy resin | 4634.0 gms |
| Bisphenol A | 2366.0 gms |
| Methyl isobutyl ketone | 524.0 gms |
| Benzoic acid | 183.0 gms |
| Tributylamine | 13.0 gms |
| Ethylene glycol monobutyl ether | 1425.0 gms |
| Ethylene glycol monohexyl ether | 150.0 gms |
| n-Butanol | 1425.0 gms |
| Total | 10720.0 gms |

Epon 829 liquid epoxy resin, Bisphenol A and methyl-isobutyl ketone are charged to a reaction vessel equipped with a stirrer, reflux, condenser, Dean Stark trap, thermometer and nitrogen inlet. Epon 829 liquid epoxy resin is a product of Shell Chemical Company and is characterized by a viscosity of 30-70 poises, 193-203 epoxide equivalent weight and 3 maximum Gardner color. The nitrogen flow is started and the batch is heated to 140° C. The batch exotherms to 201.5° C. The 524 gms methylisobutyl ketone is removed via the Dean Stark trap. The batch is cooled to 171° C. and held for one hour. The oxirane value is measured and is found to be 0.52 meq/gm. The batch is cooled to 150° C. and the benzoic acid and tributylamine are added. The batch is held for one hour and the oxirane and acid content are measured. The acid number is 0 and the oxirane level is 0.27 meq/gm. Ethylene glycol monobutyl ether and ethylene glycol monohexyl ether are added. When uniform, the batch is cooled to 110° C. and n-Butanol is added. The batch is cooled to room temperature. The resulting epoxy resin solution has a solids content of 67%. The epoxy resin has a number average molecular weight in excess of 1500, an acid number of 0 and an oxirane level of 0.27 meq/gm.

The epoxy acrylate polymer solution is prepared as follows:

|  | Parts by Weight |
| --- | --- |
| Acrylic polymer solution (prepared above) | 473.0 gms |

-continued

|  | Parts by Weight |
|---|---|
| Dimethylaminoethanol | 1.6 gms |
| Epoxy polymer solution (prepared above) | 1039.0 gms |
| Dimethylaminoethanol | 56.3 gms |
| Total | 1569.9 gms |

The acrylic polymer solution, the epoxy polymer solution and the 1.6 gms dimethylaminoethanol are charged to a reactor equipped with a stirrer, condenser, thermometer and a nitrogen inlet. The nitrogen flow is started and the batch is heated to 117° C. The batch is held at 117° C. for five hours and the acid and oxirane levels are measured. The acid number is 67 and the oxirane level is less than 0.01 meq/gm. 56.3 gms dimethylaminoethanol are added to partially neutralize the polymer acidity, stirred until uniform and cooled to room temperature. The resulting epoxy acrylate polymer solution has a solids content of 65%. The polymer has the composition epoxy/acrylic-7030 and is characterized by an acid number of 66.8 and an oxirane value of 0.

A water dispersion of the above produced epoxy acrylate polymer solution is prepared as follows:

|  | Parts by Weight |
|---|---|
| Partially neutralized epoxy acrylate polymer solution (prepared above) | 300.0 gms |
| Deionized water | 300.0 gms |
| Total | 600.0 gms |

The epoxy acrylate polymer solution is placed into a dispersion vessel equipped with a stirrer and is heated to 80° C. Agitation is started and the deionized water is added over a 15 minute period. Agitation is continued until all of the polymer is dispersed. The dispersion is cooled to room temperature. The dispersion has a solids content of 32.9% and is characterized by 7.77 pH, 0.28 micron particle size, 1200 centipoise viscosity (Brookfield 1 spindle, 30 RPM) and a water/organic solvent ratio of 71/29 by weight.

The above prepared dispersion is modified with a melamine-formaldehyde resin, Cymel 370 (American Cyanamid Company) at 7% solids on solids level. The resulting mixture is cast on aluminum substrate with a wire-wound bar. The coated panels are baked 75 seconds total time at 400° F. in a forced air oven. The baked films display excellent wetting, clarity and gloss. Other film properties are listed below.

| Methyl ethyl ketone double rubs | 23 |
|---|---|
| Pasteurization adhesion | 10 |
| Pasteurization blush | 10 |
| Wedge bend flexibility | 6+ |
| (Rating: 10 = No failure, 0 = Complete failure) | |

As a matter of interest, the same polymer, without benzoic acid defunctionalization would gel.

EXAMPLE VI

Into a 3 liter round bottom flask, equipped with reflux condenser, heating means, stirrer, thermometer and inert gas blanket were charged 672.8 gms of 2-ethoxyethanol and 913.0 gms of a diglycidyl ether of Bisphenol A having an epoxide equivalent weight of 1.1 meq/g. (Epon 1004 from Shell Chemical Company). After heating to dissolve the epoxy resin, 96.2 gms of octanoic acid was added together with 2.0 gms of tri-n-Butylamine. The reaction mixture was heated at 135°-140° C. until the acid value fell below 1.

An acrylic copolymer solution was produced by copolymerizing 75.6 parts of ethyl acrylate with 24.4 parts of methacrylic acid in organic solvent solution in 2-ethoxyethanol. The solution copolymer product had a nonvolatile solids content of 71.8% and the solids had an acid number of 158.

400 gms of the epoxy-octanoic acid ester solution produced above was then reacted at 138° C. with 167.8 gms of the ethyl acrylate methacrylic acid copolymer solution produced above. A clear reaction product was obtained with the solids thereof having an acid number of 43.

Ammonia is added to neutralize the copolymer acidity and then hexamethoxymethylamine is added (Cymel 300 from American Cyanamid may be used) in an amount of 10 parts per 100 parts of resin solids.

This neutralized copolymer solution is diluted with deionized water to provide an emulsion containing approximately 30% by weight of resin solids and the aqueous composition so obtained is applied to aluminum panels with a wire wound bar to provide a film having a thickness of approximately 0.15 mil. Prior to dilution with water, a small amount (0.5% based on the weight of resin solids) of a curing catalyst is added (Alipal CO-436 supplied by General Aniline). The aminoplast cure and its catalysis are conventional. The coated panels were cured by placing them in an oven maintained at 408° F. for 75 seconds.

| The following characteristics are obtained: | |
|---|---|
| Methyl ethyl ketone double rubs to remove coating | 42 |
| Wedge bend flexibility | 4 |
| Pasteurization adhesion and blush resistance | 10 |
| (Rating: 10 = No failure, 0 = Complete failure) | |

We claim:

1. A nongelled hydroxy ester copolymer composition substantially free of oxirane functionality comprising an acidic copolymer-epoxy resin hydroxy ester reaction product produced by esterifying an acidic copolymer with an epoxy resin in the presence of amine catalyst in amounts larger than 2% by weight of reactants subjected to esterification to avoid a useless gel, the epoxy resin being a mixture containing at least 5% by weight of aromatic polyether which is difunctional in oxirane functionality which is consumed by reaction with the acidic copolymer and the acidic copolymer being a solution copolymer of monoethylenically unsaturated monomers comprising at least about 20% of monoethylenically unsaturated carboxylic acid, based on the total weight of monomers, the epoxy resin mixture constituting at least about 40% of the total resin solids content and providing oxirane functionality in a stoichiometric deficiency with respect to carboxyl functionality in the acidic copolymer of from 1:2 to 1:20, at least a portion of the carboxyl functionality in the copolymer-epoxy resin hydroxy ester reaction product being reacted with a base to render the reaction product self-emulsifiable in water.

2. The composition of claim 1 wherein the monoethylenically unsaturated carboxylic acid is methacrylic acid.

3. The composition of claim 1 wherein the monoethylenically unsaturated monomers other than the monoethylenically unsaturated carboxylic acid are nonreactive.

4. The composition of any one of claims 1 to 3 wherein the monoethylenic carboxylic acid is present in an amount of from 30% to 80% based on the total weight of monomers.

5. The composition of claim 1 wherein the aromatic polyethers include at least 3% by weight of aromatic polyether carrying two glycidyl ether groups.

6. The composition of claim 1 wherein the aromatic polyethers include at least 10% by weight of aromatic polyether devoid of oxirane functionality.

7. The composition of claim 1 wherein the aromatic polyethers are terminated by either glycidyl ether groups or bisphenol groups.

8. The composition of claim 1 wherein the epoxy resin mixture is reacted with preformed acidic copolymer under esterification conditions to consume the oxirane functionality in the epoxy resin.

9. The composition of claim 1 wherein the composition further includes from 1–25% of curing agent selected from aminoplast resins, phenoplast resins, and mixtures thereof, based on the weight of total resin.

10. The composition of claim 1 wherein the epoxy resin is a mixture containing at least 10% by weight of bisphenolic polyether containing oxirane functionality, at least 3% by weight of the bisphenolic polyethers being diglycidyl ethers, and the oxirane functionality being consumed by reaction with the acidic copolymer, and at least 10% by weight of bisphenolic polyether devoid of oxirane functionality, and the acidic copolymer is a solution copolymer of mono-ethylenically unsaturated monomers comprising about 30% to about 70% of methacrylic acid, based on the total weight of monomers, the balance of the monomers being nonreactive, the epoxy resin mixture constituting at least about 50% of the total resin solids content and providing oxirane functionality in a stoichiometric deficiency with respect to carboxyl functionality in the acidic copolymer of from 1:4 to 1:10, from about 30% to about 90% of the carboxyl functionality in the copolymer-epoxy resin hydroxy ester reaction product being reacted with volatile amine to render the reaction product self-emulsifiable in water.

11. The composition of claim 10 wherein an aminoplast resin is present in an amount of from 2–12%, based on the total weight of resin.

12. A stable aqueous emulsion comprising the hydroxy ester copolymer composition of claim 1 dispersed in water.

13. The emulsion of claim 12 wherein amine is used to form a salt with 50% to 90% of the available carboxyl groups, and water is present in an amount to provide a solids content of 18% to 25%.

14. Process for preparing a self-emulsifiable epoxy ester copolymer mixture which comprises esterifying a solvent-soluble carboxy-functional polymer comprising polymerized ethylenically unsaturated monomers with an epoxy resin which is a mixture comprising aromatic polyethers containing oxirane functionality, at least 5% of the aromatic polyethers being constituted by diepoxide, the mixture of aromatic polyethers constituting at least 40% of the total resin solids content and providing oxirane functionality in a stoichiometric deficiency with respect to carboxyl functionality in the carboxyl-functional polymer of from 1:2 to 1:20, the esterification being carried out in organic solvent medium in the presence of greater than 2% of an amine esterification catalyst, based on the weight of the reactants subjected to esterification, and at an elevated temperature sufficient to cause the oxirane functionality to react with the carboxyl functionality until the oxirane functionality is substantially entirely consumed and reaching at least a portion of the carboxyl functionality in the resultant polymer-epoxy resin hydroxy ester reaction product with a base to render the reaction product self-emulsifiable in water.

15. The process of claim 14 wherein the esterification is carried out in alcoholic solvent medium.

16. The process of claim 14 wherein there is present more than one equivalent of oxirane functionality per molecule of carboxy-functional polymer.

17. The process of claim 14 in which the carboxyl-functional polymer is a solution copolymer of monoethylenically unsaturated monomers comprising at least about 20% of monoethylenically unsaturated carboxylic acid, based on the total weight of monomers.

18. The process of claim 17 wherein the monoethylenically unsaturated carboxylic acid is methacrylic acid.

19. The process of claim 18 wherein the monoethylenically unsaturated monomers other than the monoethylenically unsaturated carboxylic acid are nonreactive.

20. The process of claim 17 wherein the monoethylenically unsaturated carboxylic acid is present in an amount of from 30% to 80%, based on the total weight of monomers.

21. The process of claim 14 wherein the aromatic polyethers include at least 10% by weight of aromatic polyether devoid of oxirane functionality.

22. The process of claim 14 wherein the aromatic polyethers are terminated by groups selected from glycidyl ether groups, phenolic groups and benzoid acid groups.

23. The process of claim 14 wherein the aromatic polyethers are bisphenolic polyethers and the oxirane functionality is provided by glycidyl ether groups.

24. The process of claim 23 wherein the aromatic polyethers contain from 10% to 95% by weight of diglycidyl ethers.

25. The process of claim 14 wherein the amine esterification catalyst is used in an amount of from 4% to 10%.

26. The process of claim 25 wherein the amine esterification catalyst is dimethyl ethanolamine.

27. The process of claim 14 wherein the base is a volatile amine.

28. The process of claim 27 wherein the base is dimethylamino ethanol.

29. The product produced according to the process of claim 14.

30. A process for producing a water-dispersed nongelled emulsion of an epoxy resin ester copolymer containing by weight at least about 40% epoxy resin esterified with an acidic copolymer, the process steps comprising:

esterifying epoxy resin with acid functional copolymer in the presence of at least about 4% by weight amine esterification catalyst based on reactants and carried out in an organic solvent medium, wherein said acid functional copolymer comprises copolymerized ethylenically unsaturated monomers including between 30% and 70% by weight monoethylenically unsaturated carboxylic acid whereby the acidic copolymer contains 4 to 10 carboxyl groups per epoxy resin oxirane groups and said epoxy resin ester copolymer contains non-esterified carboxyl groups;

reacting at least a portion of the non-esterified carboxyl groups on said epoxy resin ester copolymer with volatile amine base and dispersing the epoxy resin ester copolymer in water to provide a nongelled emulsion.

31. The process in claim 30 wherein the acid functional copolymer is formed by polymerizing said monomers in the presence of a minor amount of organic solvent.

32. The process in claim 30 wherein esterification of the epoxy resin with the acid functional polymer is carried out in the presence of a minor amount of organic solvent, and said amine esterification catalyst level is between 4% and 10%.

33. The process in claim 30 wherein the amine esterification catalyst dimethylaminoethanol.

34. The nongelled hydroxy ester copolymer of claims 1, 8, or 10 wherein the epoxy resin is esterified with acidic copolymer in the presence of amine catalyst in amounts larger than 0.3% by weight of reactants to avoid a useless gel and provide a nongelled epoxy resin ester copolymer.

35. The nongelled hydroxy ester copolymer in claim 8 wherein the esterification conditions comprise the inclusion of amine esterification catalyst in amounts larger than 2% by weight of reactants to avoid a useless gel while forming said acidic copolymer-epoxy resin hydroxy ester reaction product.

36. The nongelled hydroxy ester copolymer of claim 34 being water dispersed by adding water to said hydroxy ester copolymer.

37. The process of claim 14 wherein said epoxy ester copolymer is dispersed into water by reacting at least a portion of said non-esterified carboxyl groups on said epoxy ester copolymer with an amine base.

38. The process of claim 37 wherein the epoxy ester copolymer is dispersed into water by adding water to the epoxy ester copolymer and mixing to provide a stable nongelled water dispersed epoxy resin ester copolymer.

39. A composition suitable for sanitary can coatings consisting essentially of a self-emulsified mixture substantially free of oxirane groups including a hydroxy ester copolymer containing carboxyl groups at least some of which, sufficient to achieve self-emulsification in water, are neutralized by volatile amine; which composition is the product of the reaction of:

(A) an acidic addition copolymer having an acid number greater than 150 comprising a copolymer of monoethylenically unsaturated monomers selected from the group consisting of styrene, vinyl toluene, acrylic acid esters, methacrylic acid esters, acrylic acid and methacrylic acid containing at least about 30% by weight of acrylic or methacrylic acid based on the total weight of monomers;

(B) a mixture containing (bispenol-A)-epichlorohydrin polyether epoxy resin including at least 5% by weight of polyether epoxy resin containing oxirane groups and at least 25% by weight of said (bisphenol-A)polyether being terminated with bisphenol-A and devoid of oxirane groups, said mixture comprising at least 40% of the total resin solids and containing sufficient oxirane groups to provide a ratio of oxirane groups to carboxyl of 1:2 to 1:20; and conducted in the presence of a tertiary amine in amounts larger than 2% by weight of reactants subjected to esterification.

40. The composition of claim 39 in which said acidic addition copolymer is the copolymer of monomers selected from the group consisting of styrene, vinyltoluene, acrylic acid esters, methacrylic acid esters and methacrylic acid.

41. The composition of claim 39 containing, in addition, 1–25 weight percent based on the total resin content, of a curing agent selected from the group consisting of aminoplast resins, phenoplast resins and mixtures thereof.

42. The composition of claim 39 in which said mixture (B) comprises at least 50% by weight of the total resins content, contains sufficient oxirane groups to provide a ratio of oxirane groups to carboxyl groups of 1:4 to 1:10, contains at least 10% by weight of polyether containing oxirane functionality, and contains at least 3% by weight of said polyethers being diglycidyl ethers; said acidic copolymer comprising about 30% to about 70% of methacrylic acid based on the total weight of monomers, the balance of said monomers being nonreactive with oxirane groups; and from about 30% to 90% of the carboxyl functionality in said copolymer hydroxy ester copolymer is reacted with a volatile amine to render composition self-emulsifiable in water.

43. A metal substrate coated with the composition of claims 39, 40, 41, or 42, and subsequently baked.

* * * * *